US011057574B2

(12) United States Patent
Goldstein (10) Patent No.: US 11,057,574 B2
(45) Date of Patent: Jul. 6, 2021

(54) SYSTEMS, METHODS, AND COMPUTER-READABLE MEDIA FOR USING A VIDEO CAPTURE DEVICE TO ALLEVIATE MOTION SICKNESS VIA AN AUGMENTED DISPLAY FOR A PASSENGER

(71) Applicant: Microsoft Technology Licensing, LLC, Redmond, WA (US)

(72) Inventor: Daniel Gray Goldstein, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/451,962

(22) Filed: Jun. 25, 2019

(65) Prior Publication Data

US 2019/0320125 A1      Oct. 17, 2019

Related U.S. Application Data

(63) Continuation of application No. 15/392,283, filed on Dec. 28, 2016, now Pat. No. 10,455,165.

(51) Int. Cl.
*H04N 5/272*      (2006.01)
*H04N 7/18*      (2006.01)
(Continued)

(52) U.S. Cl.
CPC ........... *H04N 5/272* (2013.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS

2007/0024527 A1\* 2/2007 Heikkinen ........ H04M 1/72544
  345/9
2012/0079426 A1\* 3/2012 Jin .......................... G06F 3/011
  715/810
(Continued)

FOREIGN PATENT DOCUMENTS

CN      101510913 A      8/2009
CN      102801924 A      11/2012
(Continued)

OTHER PUBLICATIONS

Oda O, Lister LJ, White S, Feiner S. Developing an augmented reality racing game. InProceedings of the 2nd international conference on INtelligent TEchnologies for interactive enterTAINment Jan. 8, 2008 (pp. 1-8). (Year: 2008).\*
(Continued)

*Primary Examiner* — Clifford Hilaire (57) ABSTRACT

Systems, methods, and computer-readable media are disclosed for using a video capture device to alleviate motion sickness via an augmented display for a passenger. One method includes receiving, from a video capture device of a vehicle, video data of a view outside of the vehicle while the vehicle is in motion; displaying, on a display device for a passenger of the vehicle, a request for a mode of display of the video data, the mode of displaying including a passive video mode and an active video mode; receiving a selection of the mode of display; displaying a request for a video display type when the passive video mode is selected; and displaying the video data including a menu, the menu including a plurality of selectable icons to interact with the video data when the active video mode is selected.

20 Claims, 7 Drawing Sheets

(51) Int. Cl.
*G06K 9/00* (2006.01)
*G06F 3/0482* (2013.01)
*G06F 3/0481* (2013.01)

(52) U.S. Cl.
CPC ..... *G06K 9/00718* (2013.01); *G06K 9/00791* (2013.01); *H04N 7/183* (2013.01)

(56) References Cited

U.S. PATENT DOCUMENTS

| | | | |
|---|---|---|---|
| 2013/0083061 A1* | 4/2013 | Mishra | A63F 13/213 345/633 |
| 2017/0185081 A1* | 6/2017 | Steele | G05D 1/0016 |

FOREIGN PATENT DOCUMENTS

| | | |
|---|---|---|
| CN | 103946732 A | 7/2014 |
| CN | 105959595 A | 9/2016 |

OTHER PUBLICATIONS

"First Office Action and Search Report Issued in Chinese Patent Application No. 201780075502.2", dated Jun. 8, 2020, 12 Pages.
"Notice of Allowance Issued in Chinese Patent Application No. 201780075502.2", dated Nov. 4, 2020, 5 Pages.

* cited by examiner

SYSTEMS, METHODS, AND COMPUTER-READABLE MEDIA FOR USING A VIDEO CAPTURE DEVICE TO ALLEVIATE MOTION SICKNESS VIA AN AUGMENTED DISPLAY FOR A PASSENGER

CROSS REFERENCE TO RELATED APPLICATIONS

This application is a continuation of U.S. patent application Ser. No. 15/392,283, filed Dec. 28, 2019, the entire contents of which is incorporated herein by reference.

TECHNICAL FIELD

Embodiments of the present disclosure relate generally to displaying at least part of a forward-facing view of a vehicle on a display device in the vehicle. More particularly, embodiments of the present disclosure relate to alleviating motion sickness by using a display device having an augmented view of a camera mounted on or in a vehicle.

INTRODUCTION

Passengers of a vehicle may have a reduced or no forward outside view of the vehicle. These passengers may get motion sickness when their senses both perceive motion of the vehicle and perceive a stationary view. Because of the reduced view or lack of a view outside of the vehicle and the feeling of the vehicle in motion, motion sickness may be induced for at least some of the passengers. For example, a passenger inside a plane or a ship may only see a stationary interior view of the plane or ship while still feeling the motion of the vehicle. Similarly, a passenger of an automobile may see a reduced front view or only a side view of the automobile in motion.

In order to reduce the likelihood of motion sickness, a passenger may be aided by looking at a stationary point of reference in front of a vehicle. For example, passengers on a ship may alleviate motion sickness by looking at a fixed object on land or at the horizon, and observing the motion of the ship relative to the fixed object or horizon. Similarly, a passenger in an automobile may alleviate motion sickness by looking out of the front windshield at stationary object in front of the vehicle.

Today, many passengers of vehicles may attempt to use display devices while the vehicles are in motion, and thus, may increase their likelihood of developing motion sickness by interacting with their display devices and reducing their outside of the vehicles. For example, a passenger editing a document, playing video games, and/or watching a video, may focus their view on the display while their body feels the relative motion of the vehicle, which may induce motion sickness.

Due to motion sickness, it is desirable to provide methods, systems, and computer-readable media that alleviate motion sickness by utilizing a display device displaying video from a camera mounted on a vehicle.

SUMMARY OF THE DISCLOSURE

According to certain embodiments, systems, methods, and computer-readable media are disclosed for using a video capture device to alleviate motion sickness via an augmented display for a passenger.

According to certain embodiments, computer-implemented methods are disclosed for using a video capture device to alleviate motion sickness via an augmented display for a passenger. One method includes: receiving, from a video capture device of a vehicle, video data of a view outside of the vehicle while the vehicle is in motion; displaying, on a display device for a passenger of the vehicle, a request for a mode of display of the video data, the mode of displaying including a passive video mode and an active video mode; receiving, from the passenger, a selection of the mode of display; displaying, on the display device for the passenger, a request for a video display type when the passive video mode is selected; and displaying, on the display device for the passenger, the video data including a menu, the menu including a plurality of selectable icons to interact with the video data when the active video mode is selected.

According to certain embodiments, systems are disclosed for using a video capture device to alleviate motion sickness via an augmented display for a passenger. One system includes a data storage device that stores instructions for using a video capture device to alleviate motion sickness via an augmented display for a passenger; and a processor configured to execute the instructions to perform a method including: receiving, from a video capture device of a vehicle, video data of a view outside of the vehicle while the vehicle is in motion; displaying, on a display for a passenger of the vehicle, a request for a mode of display of the video data, the mode of displaying including a passive video mode and an active video mode; receiving, from the passenger, a selection of the mode of display; displaying, on the display for the passenger, a request for a video display type when the passive video mode is selected; and displaying, on the display for the passenger, the video data including a menu, the menu including a plurality of selectable icons to interact with the video data when the active video mode is selected.

According to certain embodiments, non-transitory computer-readable media are disclosed that store instructions that, when executed by a computer, cause the computer to perform a method for using a video capture device to alleviate motion sickness via an augmented display for a passenger. One computer-readable medium includes the method of: receiving, from a video capture device of a vehicle, video data of a view outside of the vehicle while the vehicle is in motion; displaying, on a display device for a passenger of the vehicle, a request for a mode of display of the video data, the mode of displaying including a passive video mode and an active video mode; receiving, from the passenger, a selection of the mode of display; displaying, on the display device for the passenger, a request for a video display type when the passive video mode is selected; and displaying, on the display device for the passenger, the video data including a menu, the menu including a plurality of selectable icons to interact with the video data when the active video mode is selected.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

For the sake of brevity, conventional techniques related to wireless data transmission, detection systems, GPS systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

Vehicle passengers, including passengers traveling by car, minivan, bus, plane, boat, etc., who do not have a view of a path ahead of the vehicle, for example, rear-seat riders, may be susceptible to developing motion sickness. Common remedies to motion sickness, including placing passengers in a place such as a "front seat" in which they may see the path ahead, may not always be available. For example, the front seat may already be occupied by another passenger, and/or there may be legal restrictions in place preventing the passenger from sitting in a front seat (e.g., commercial airline passengers may not be allowed to ride in the cockpit, and children may be legally required to ride in the rear seat of a vehicle). Further, even when a passenger is in a front seat, the passenger may not have a view of the path ahead of the vehicle if they are looking down to interact with a digital device.

The present disclosure relates to obtaining a video feed from a camera that is mounted in or on a vehicle and displaying the video feed to a passenger or a user on a display device, such as a tablet, smartphone, laptop, a display screen mounted inside the vehicle, or any device with a display. The video may be displayed on the whole screen of the display device, an overlay of the screen of the display device, and/or a portion of the screen of the display device. This video on the display device may allow for direct or peripheral vision of the passenger or user to detect the video feed from the camera, and may allow the passenger or user to perceive a similar line of sight as the driver of the vehicle. When a passenger perceives a similar line of sight as the driver of the vehicle, the passenger may prevent and/or alleviate motion sickness that may have developed due to an obstructed view while feeling the vehicle in motion.

In one embodiment of the present disclosure, a passenger or a user of the display device may interact with the video feed through an application running on the display device. For example, the passenger or the user may play various games that incorporate use of the video feed from the camera mounted in or on the vehicle. In one embodiment, the passenger or the user may virtually race other real vehicles and/or virtual vehicles on the path ahead of the vehicle. Additionally, or alternatively, the passenger or user may interactively create various obstacles or introduce other characters within the real-time video feed.

For example, a passenger within the vehicle may use a video feed of a forward-facing video camera to detect neighboring vehicles on his or her display device. The neighboring vehicles within a field-of-view of the video feed from the camera may be detected by for example, a vehicle recognition program running on the display device. The neighboring vehicles may also have forward facing camera and/or other sensors for detecting the vehicle in which the passenger is traveling, and thus, the neighboring vehicle may detect the vehicle in which the passenger is traveling. Using communication capabilities, the vehicle and neighboring vehicles may communicate with each other and provide video feeds and/or other sensor data to each other. With the video feed from the vehicle in which the passenger is travelling and/or the video feeds and/or other sensor data from neighboring vehicles, the display device may augment the video feed displayed to the passenger.

In one embodiment of the present disclosure, a passenger of a vehicle with a camera mounted in or on a vehicle may play a racing game that allows the passenger to operate a virtual vehicle driving in front of the vehicle in which the passenger is traveling. Points may be awarded to and/or removed from a score of the passenger based on interactions with real and/or virtual objects displayed on the display device. For example, the score of the passenger may be increased or decreased based on driving habits of the passenger of the virtual vehicle, the ability of the passenger to avoid and/or cause collisions with real or virtual objects, the ability of the passenger to collect virtual points and/or virtual items on the screen, the passing or being passed by drivers of neighboring vehicles, virtual vehicles, and/or other virtual vehicles of other passengers, etc. In an alternate embodiment, the application running on the display device may connect wirelessly to the Internet and/or connect via a wired connection to other display devices in the vehicle, and thus, the application may provide access to online gaming with other passengers located in proximity of the vehicle in which the camera is mounted.

In one embodiment of the present disclosure, a passenger of a vehicle with a camera mounted in or on a vehicle may insert one or more virtual objects in front of the vehicle or other vehicles. For example, the one or more virtual objects may be walls, pot holes, oil spills, slime, and/or other objects. The vehicle, virtual vehicles, and/or other neighboring vehicles may interact with and/or collide with these virtual objects. Additionally, the passenger may be awarded points for these interactions.

In one embodiment of the present disclosure, a passenger of a vehicle with a camera mounted in or on a vehicle may play a guessing game and/or an "I-Spy" game. For example, the display device may include an optical recognition module and/or an optical character recognition module, and the passenger may be sent a request to identify a certain type of color, a certain type of vehicle, a certain type of road feature, a certain word and/or character. The passenger may be awarded and/or penalized points based on his or her response. Additionally, the passenger may play games with other passengers in the vehicle, in neighboring vehicles, and/or with other users online. For example, the passenger may identify an object, word, color, etc., and other passengers may attempt to identify the object, word, color, etc. that the passenger identified.

As will be described in further detail below, the display device may allow a passenger of the vehicle to select between a passive video mode and an active video mode. The passive video mode may allow the passenger to view the video feed of the camera mounted in or on the vehicle without augmentation to the video feed. This may allow the passenger to use a display device to alleviate or prevent motion sickness by presenting a view in front of the vehicle. The active video mode may allow the passenger to create and interact with an augmented video feed, such as play games and/or create virtual objects in the video feed.

Figure 1:
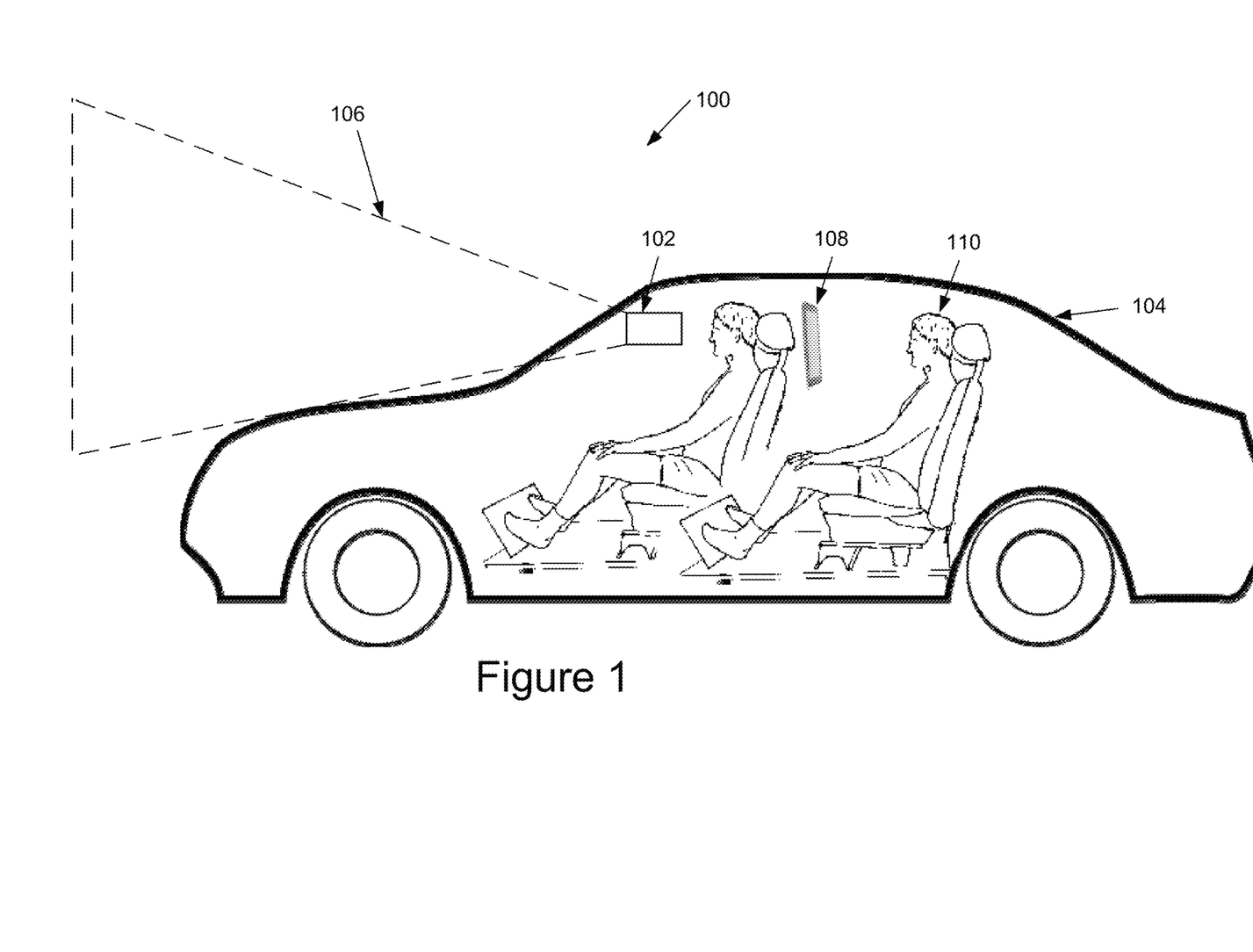
FIG. 1 depicts an exemplary environment in which video data from a video capture device mounted in or on a vehicle is displayed on a display device of a passenger of the vehicle, according to an embodiment of the present disclosure

FIG. 1 depicts an exemplary environment 100 in which video data from a video capture device mounted in or on a vehicle is displayed on a display device of a passenger of the vehicle, according to an embodiment of the present disclosure. In an embodiment of the present disclosure, a video capture device 102 may be mounted in a vehicle 104. The video capture device 102 may be, for example, one or more video cameras and/or other similar imaging devices, such as infrared and night-vision cameras, that capture real-time video. The video capture device 102 may be mounted at least in a forward-facing direction. Alternatively, and/or additionally, one or more additional video capture devices may be mounted in the forward-facing direction and/or other directions. For example, a plurality of video capture devices 102 may be mounted in and/or on vehicle 104 to provide a full 360 degree field of view to a passenger. In one embodiment of the present disclosure, the video capture device 102 may be mounted on the dashboard of the vehicle 104 and/or on a windshield of vehicle 104. In another embodiment, the video capture device 102 may be mounted outside of the vehicle 104, i.e., on the hood of the vehicle 104, on a grill of the vehicle 104, and/or other locations on the vehicle 104. A person of ordinary skill in the art will appreciate that one or more video capture devices 102 may be mounted in a wide variety of locations in and/or on the vehicle 104, and each of these arrangements is considered to be within the scope of the present disclosure.

The video capture device 102 may capture optical images of an external environment 106 of the vehicle 104. In one embodiment, the video capture device 102 may capture forward-facing video data of the external environment 106. For example, the video capture device 102 may convert optical video data into electronic video data, which may be transmitted wired or wirelessly from the video capture device 102 to a display device 108 of a passenger 110.

Accordingly, electronic video data may be provided to the display device 108 of the passenger 110. In a wired and/or wireless embodiment, the display device 108 may be built into the back of a seat in front of the passenger 110 or into a flip-out or drop-down overhead video display system (not shown). In a wireless embodiment, the display device 108 may be one or more of a mobile laptop, a tablet computer, a smartphone, and/or a portable dedicated gaming device. In one embodiment, the electronic video data may be transmitted to a remote display device (not shown) or a remote server (not shown) by a high-bandwidth, low-latency communication system, such as a third generation (3G) and/or fourth generation (4G) cellular communication system. In this way, a remote user and/or passenger in another vehicle may follow along on a route of the vehicle 104, and also interact with the electronic video data.

Figure 2:
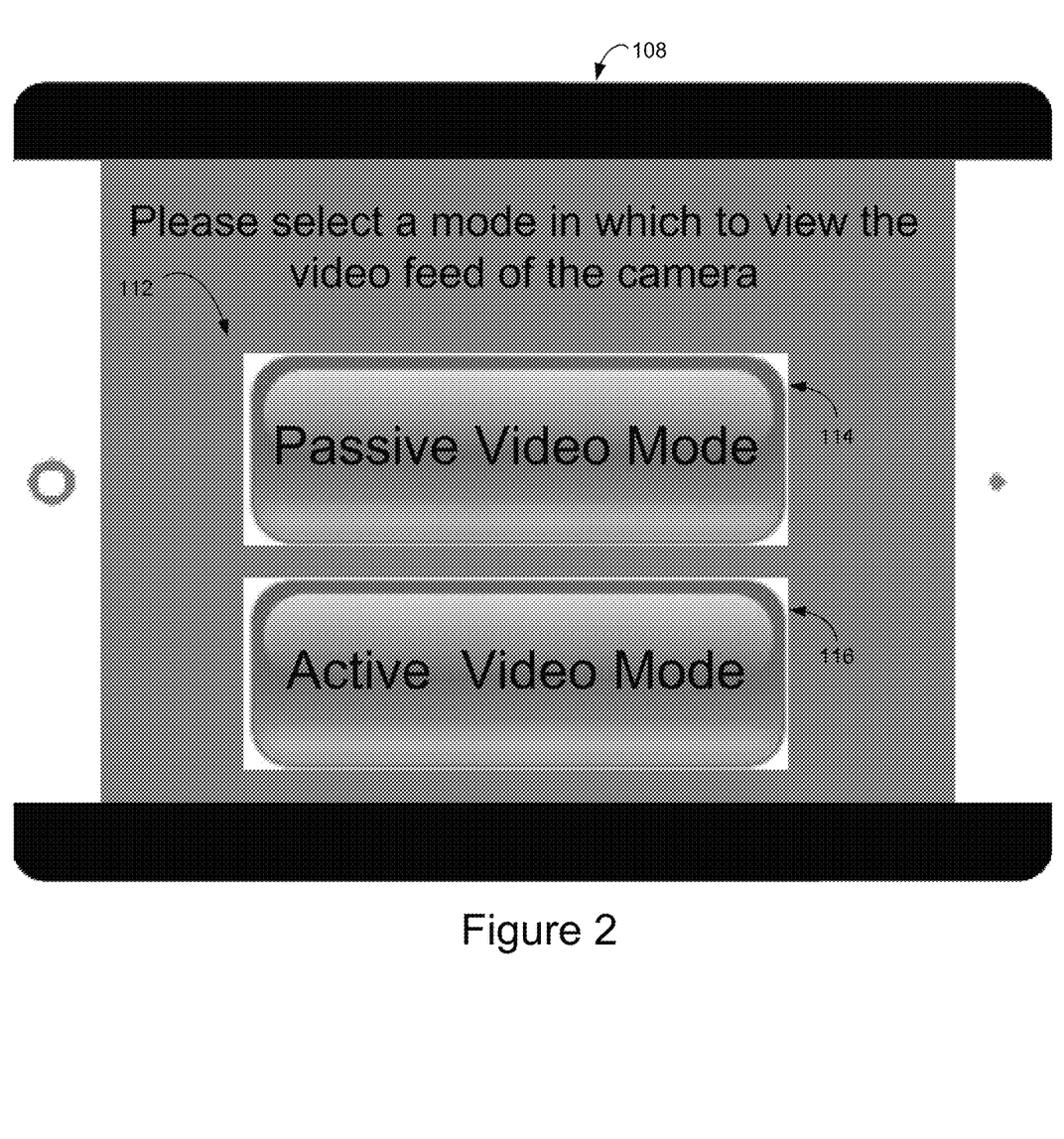
FIG. 2 depicts an exemplary display of a display device of video data from a video capture device mounted in or on a vehicle, according to an embodiment of the present disclosure.
Figure 3A:
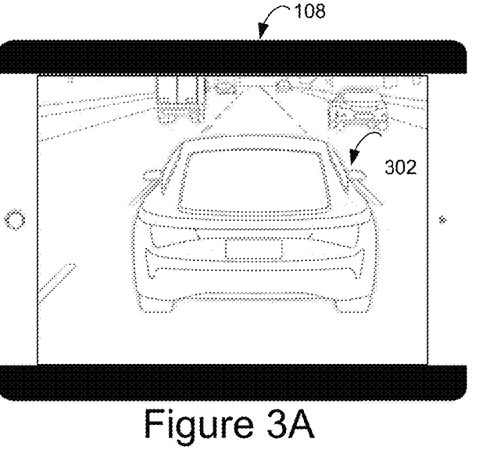
FIGS. 3A-3D depict exemplary displays of a display device of video data from a video capture device mounted in or on a vehicle while in a passive video mode, according to an embodiment of the present disclosure.
Figure 3B:
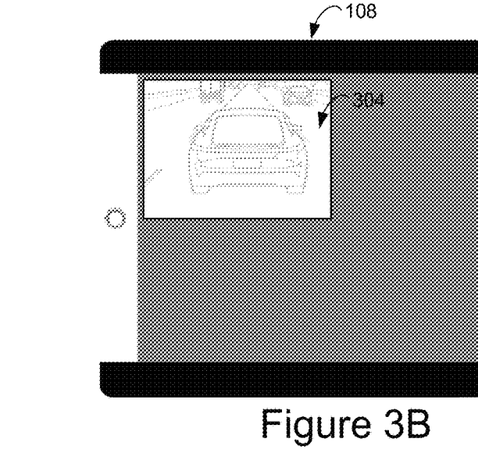
Figure 3C:
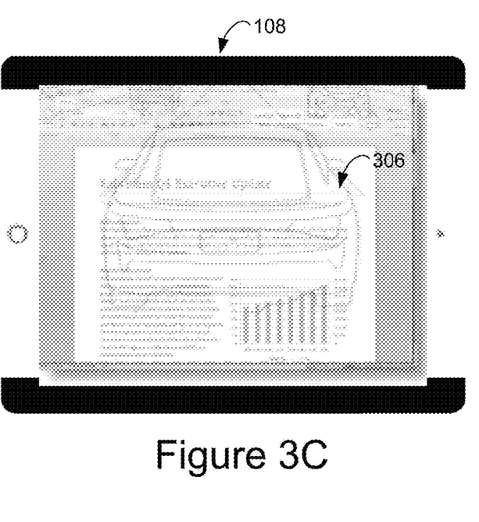
Figure 3D:
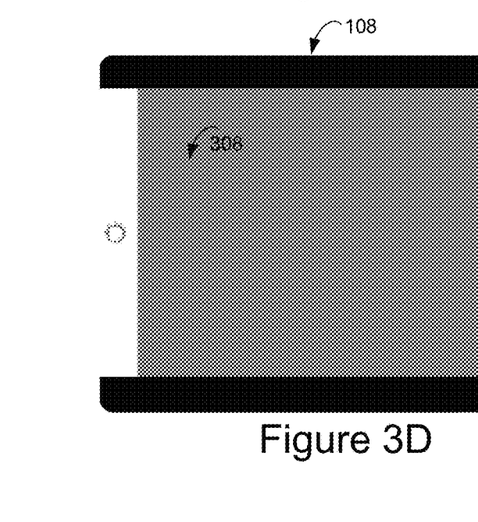

The display device 108 may receive the electronic video data of a video capture device 102 mounted on a vehicle 104. In one embodiment, the electronic video data may be forward-facing video data. FIG. 2 depicts an exemplary display of a display device of video data from a video capture device mounted in or on a vehicle, according to an embodiment of the present disclosure. When the display device 108 receives the electronic video data, the display device 108 may display, to the passenger 110, a request 112 for a selection of a mode of display of the electronic video data. The mode of display of the electronic video data may include a passive video mode 114 and an active video mode 116. After displaying the request 112 for the selection of the mode of display, the display device may receive, from the passenger 110, a selected mode of display.

When the passive video mode 114 is selected by the passenger 110, the electronic video data of the video capture device 102 may be displayed to the passenger 110 on the display device 108 without and changes to and/or augmentation of the electronic video data. The electronic video data may be of forward-facing video data that provides the passenger 110 with real-time images of the external environment 106. The real-time images of the external environment 106 may alleviate motion sickness by allowing the passenger 110 to observe at a fixed object in front of the vehicle 104 or at the horizon in front of the vehicle 104. Further, if infrared and night-vision cameras are employed, the real-time images of the external environment 106 may be used to alleviate motion sickness at night.

FIGS. 3A-3D depict exemplary displays of a display device of video data from a video capture device mounted in or on a vehicle while in a passive video mode, according to an embodiment of the present disclosure. When the passive video mode 114 is selected by the passenger 110, a request for a passive video display type may be displayed on the display device 108. As shown in FIGS. 3A-3D, the passive video display type may include a full screen display type 302, a windowed display type 304, an overlay display type 306, and a percentage display type 308. A full screen display type may display the electronic video data of the video capture device 104 on a full screen of the display device 102. An overlay display type may display the electronic video data of the video capture device as one of a transparent background of the desktop of the graphic user interface of the display device 102 or a transparent window on the desktop of the graphic user interface of the display device 102. The transparent background or transparent window may allow the passenger 110 to view the external environment 106 captured by the video capture device 102 while also allowing the passenger 110 to interact with the graphic user interface of the display device 102. A windowed display type may display the electronic video data of the video capture device 104 as a window on the desktop of the graphic user interface of the display device 102. A percentage display type may display the electronic video data of the video capture device 104 as a percentage of the display on the desktop of the graphic user interface of the display device 102. For example, the electronic video data may occupy a top 25% of the display, a bottom 25% of the display device, a left 25% of the display, a right 25% of the display, and/or any other percentage of the display of the display device. In an alternative embodiment, a passive video display type may also include a background display type that may display the electronic video data of the video capture device as a background of a desktop of a graphic user interface of the display device 102.

Figure 4:
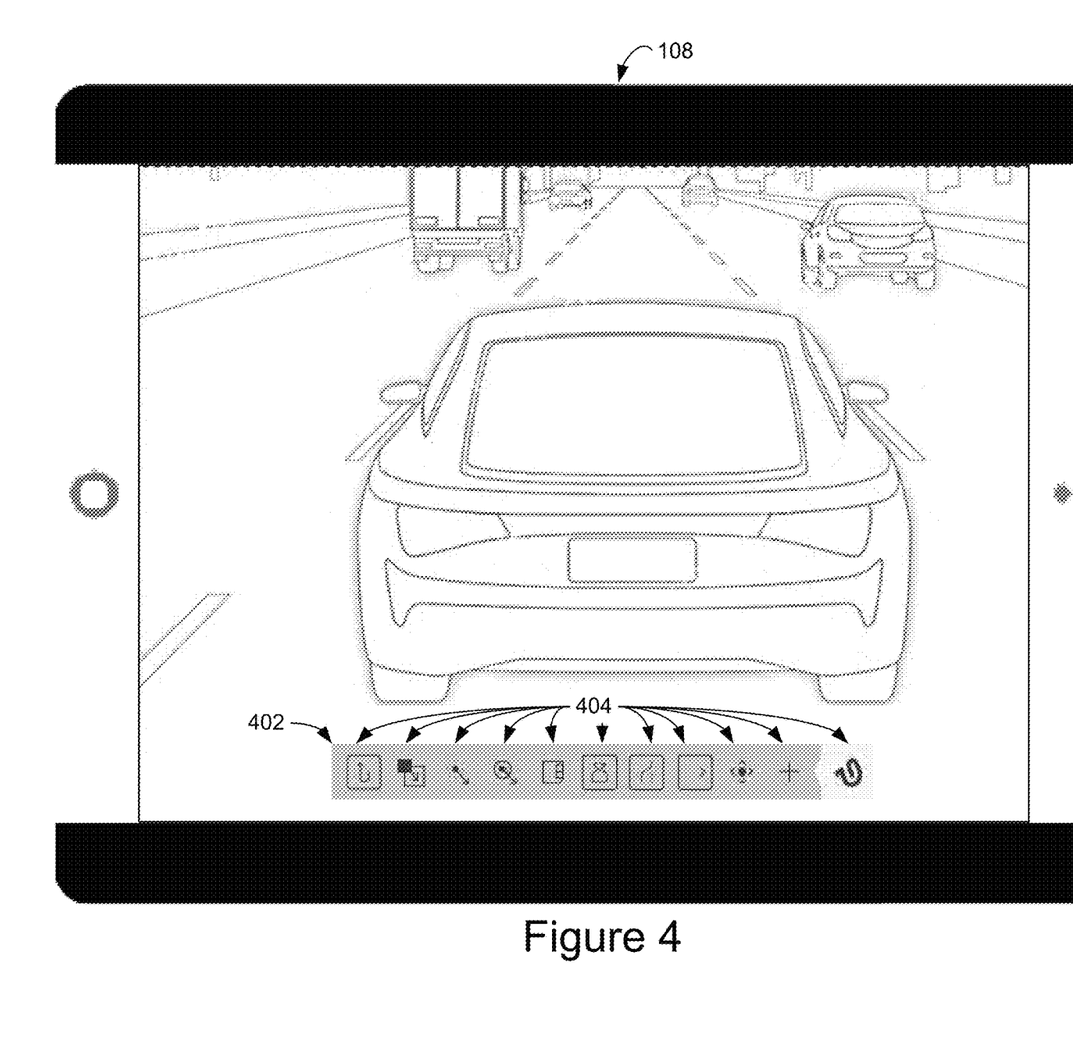
FIG. 4 depicts an exemplary display of a display device of video data from a video capture device mounted in or on a vehicle while in an active video mode, according to an embodiment of the present disclosure.

FIG. 4 depicts an exemplary display of a display device of video data from a video capture device mounted in or on a vehicle while in an active video mode, according to an embodiment of the present disclosure. When the active video mode 116 is selected by the passenger 110, an interactive menu 402 may be displayed on the display device 108, along with the electronic video data of the video capture device 104. As shown in FIG. 4, the interactive menu 402 may include selectable icons 404 for interacting with the electronic video data.

Figure 5:
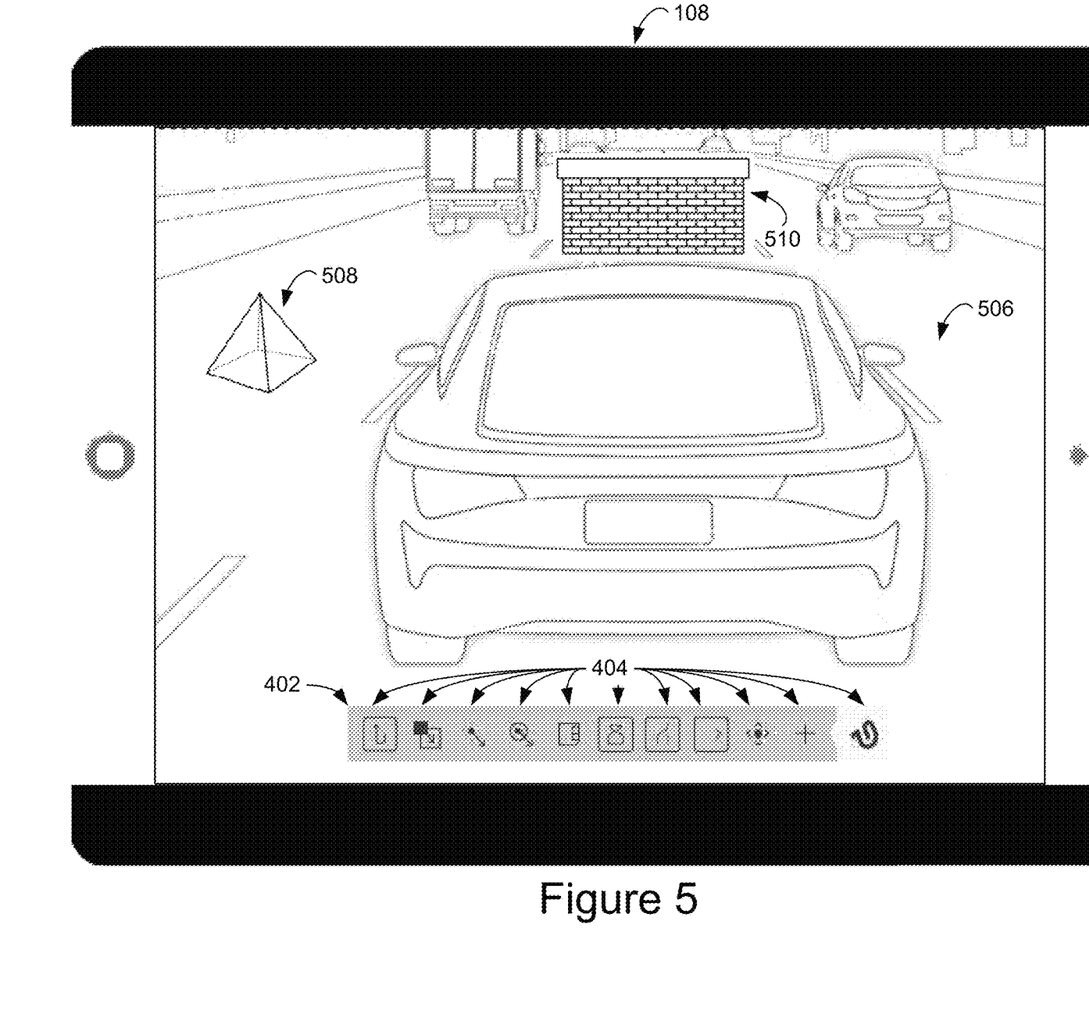
FIG. 5 depicts an exemplary augmented display of a display device of video data from a video capture device mounted in or on a vehicle while in an active video mode, according to an embodiment of the present disclosure.

FIG. 5 depicts an exemplary augmented display of a display device of video data from a video capture device mounted in or on a vehicle while in an active video mode, according to an embodiment of the present disclosure. The display device 108 may create an augmented reality video 506 by merging, augmenting, and/or fusing the electronic video data of the video capture device 104 with one or more virtual images 508, 510, the one or more virtual images 508, 510 may be based on the selectable icon 404 selected by the passenger 110. Accordingly, a display device 108 may allow a passenger to play an augment reality game. During a game, augmented reality video 506 includes video feed into which various virtual objects 508, 510 have been added.

In one embodiment of the present disclosure, the interactive menu 402 may include selectable icons 404 for creating simulated controls, simulated terrains, simulated barriers, simulated weapons, and/or other simulated obstacles or obstructions that may be created by software running on the display device 104 and merged, augmented, and/or fused with the electronic video data of the video capture device 104. For example, as shown in FIG. 5, a virtual wall 510 and a virtual pyramid 508 are shown with the electronic video data in the augmented reality video 506.

When the active video mode 116 is selected by the passenger 110, the display device 104 may analyze the electronic video data of the video capture device 104 to recognize objects within the electronic video data. For example, the display device 104 may include object recognition functionality to detect virtual and real objects in the augmented reality video 506. Object recognition functionality may include optical character recognition to recognize text on signs and/or other vehicles. Object recognition functionality may also include road feature recognition, such as recognizing signs, lanes, shoulders, exits, ramps, intersections, overpasses, etc.; and vehicle recognition, such recognizing vehicles, types of vehicles, etc.

In additional and/or alternative embodiments of the present disclosure, the augmented reality video 506 may also include information about the vehicle 104, such as fuel, speed, location, distance to a destination, distance from a source, distance travelled, etc., and/or information about the augmented reality video, such as game information, points, score, damage, fuel, effects, etc. For example, current fuel and a current score may be included in the augmented reality video 506. Additionally, along with the display of the current fuel, points may be awarded and/or deducted, and/or virtual damage may be displayed as a result of a collision with one or more virtual objects. In one embodiment, the results of a collision, i.e., virtual damage, may be overlaid on a real object or virtual object.

As discussed above, the augmented reality video 506 may be provided in real-time to the display device of the passenger via a wired connection or via a wireless connection. The passenger may then interact with the selectable icons 404 and/or additional controls to input virtual objects and/or to control virtual vehicles. An application running on the display device may store and update values in a memory of one or more of virtual objects, virtual vehicles, points, score, damage, fuel, and/or effects associated with the augmented reality video 506 being controlled by the passenger. Based on updates to the augmented reality video 506 and/or input by the passenger, the augmented reality video 506 may be updated The passenger may control the augmented reality video 506 by interacting with the selectable icons 404. It should be noted that instead of selectable icons 404, keyboards, mice, buttons, joysticks, trackballs, dials, levers, triggers, sliders, and/or any analog and/or digital input devices may be used to interact with the augmented reality video 506.

Figure 6:
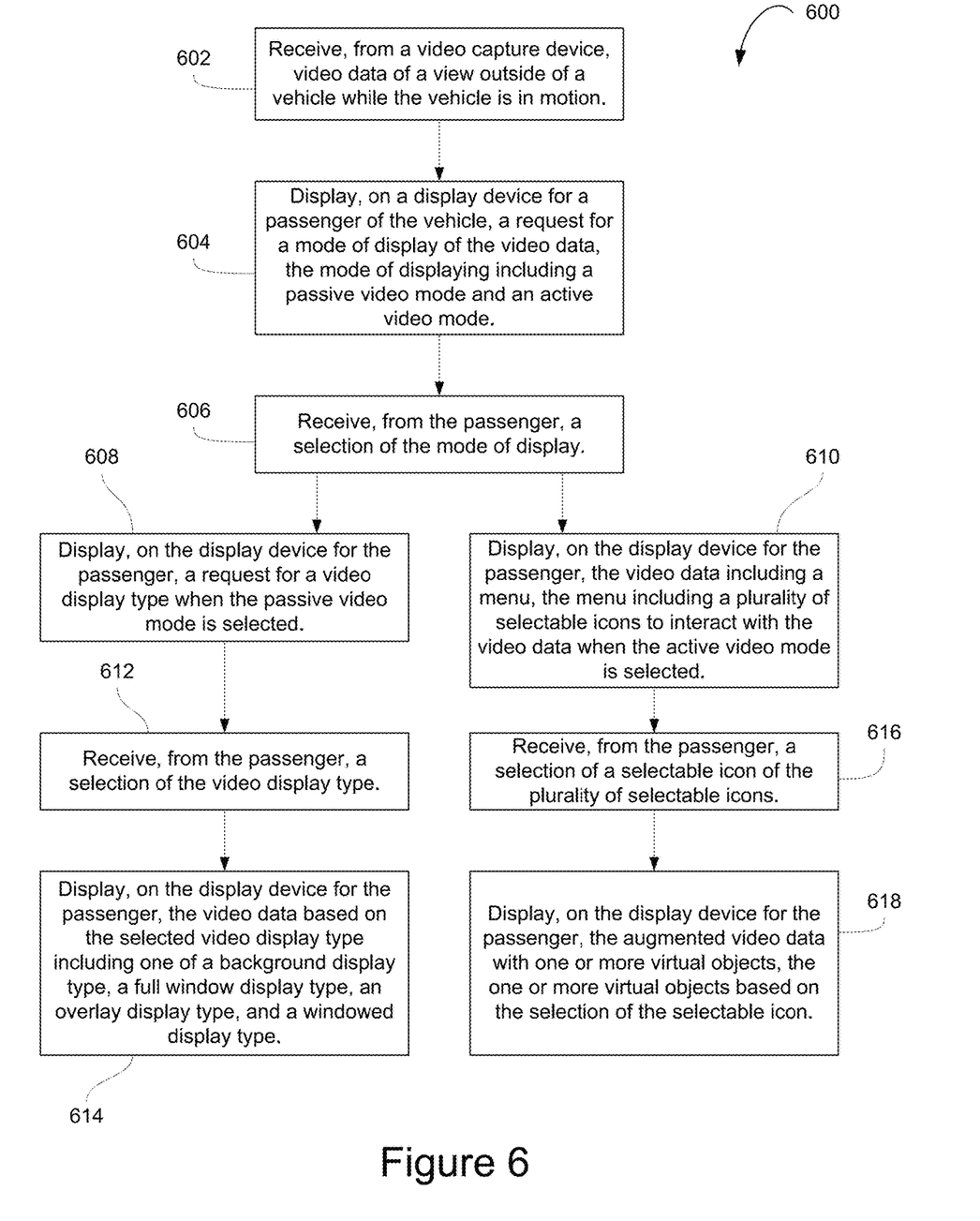
FIG. 6 depicts a flowchart illustrating a method for using a video capture device to alleviate motion sickness via an augmented display for a passenger, according to embodiments of the present disclosure.

FIG. 6 depicts a flowchart illustrating a method 600 for using a video capture device to alleviate motion sickness via an augmented display for a passenger, according to embodiments of the present disclosure. The various tasks and/or steps performed in connection with the method 600 of FIG. 6 may be performed by software, hardware, firmware, and/or any combination thereof. For illustrative purposes, the following description of the method of FIG. 6 may refer to elements mentioned above in connection with FIGS. 1, 2, 3A-3D, 4, and 5. In practice, portions of the method of FIG. 6 may be performed by different elements of the described system. It should also be appreciated that the method of FIG. 6 may include any number of additional and/or alternative tasks and/or steps and that the method 600 of FIG. 6 may be incorporated into a more comprehensive procedure or process having additional functionality not described in detail herein. Moreover, one or more of the tasks and/or steps shown in FIG. 6 may be omitted from an embodiment of the method of FIG. 6.

Method 600 may begin at step 602 in which video data of a view outside of a vehicle while the vehicle is in motion may be received from a video capture device. The video capture device of the vehicle may be mounted in the vehicle and/or mounted on the vehicle. Additionally, and/or alternatively, the video data of the video capture device may be of a forward-facing view outside of the vehicle while the vehicle is in motion.

After receiving video data from the video capture device, at step 604, a display device for a passenger of the vehicle may display request for a mode of display of the video data. The mode of displaying the video data may include a passive video mode and an active video mode. Then, at step 606, a selection of the mode of display of the video data may be received from the passenger.

After receiving the selection of the mode of display of the video data, the display device for the passenger may display a request for a video display type when the passive video mode is selected at step 608, or the display device for the passenger may display the video data including a menu, the menu including a plurality of selectable icons to interact with the video data when the active video mode is selected at step 610.

After displaying the request for the video display type when the passive video mode is selected, at step 612, a selection of the video display type may be received from the passenger. The video display type may include one of a background display type, a full window display type, an overlay display type, a windowed display type, and a percentage display type. Then, at step 614, the display device for the passenger may display the video data based on the selected video display type.

After displaying display the video data including the menu, at step 616, a selection of a selectable icon of the plurality of selectable icons may be received from the passenger. Displaying the video data including the menu may also include analyzing video data of the video capture device of the view outside of the vehicle while the vehicle is in motion to identify at least one target object in the video data representing a real object in the view outside of the vehicle. The menu including the plurality of selectable icons to interact with the identified real object may also be displayed, and the plurality of selectable icons that are displayed may be based on at least one of the identified real object and the analyzed video data. The display device may display augment video data that includes a virtual object on and/or around the identified real object based on a selection of a first selectable icon of the plurality of selectable icons. The display device may create the augmented video data by one of merging, augmenting, and/or fusing the video data of the video capture device with one or more virtual objects, the one or more virtual objects may be based on the selection of the selectable icon by the passenger. The selection of the selectable icon may identify at least one virtual object to include in the augmented video data.

After receiving the selection of a selectable icon of the plurality of selectable icons, at step 618, the display device may display the augmented video data with one or more virtual objects, the one or more virtual objects may be based on the selection of the selectable icon by the passenger.

Figure 7:
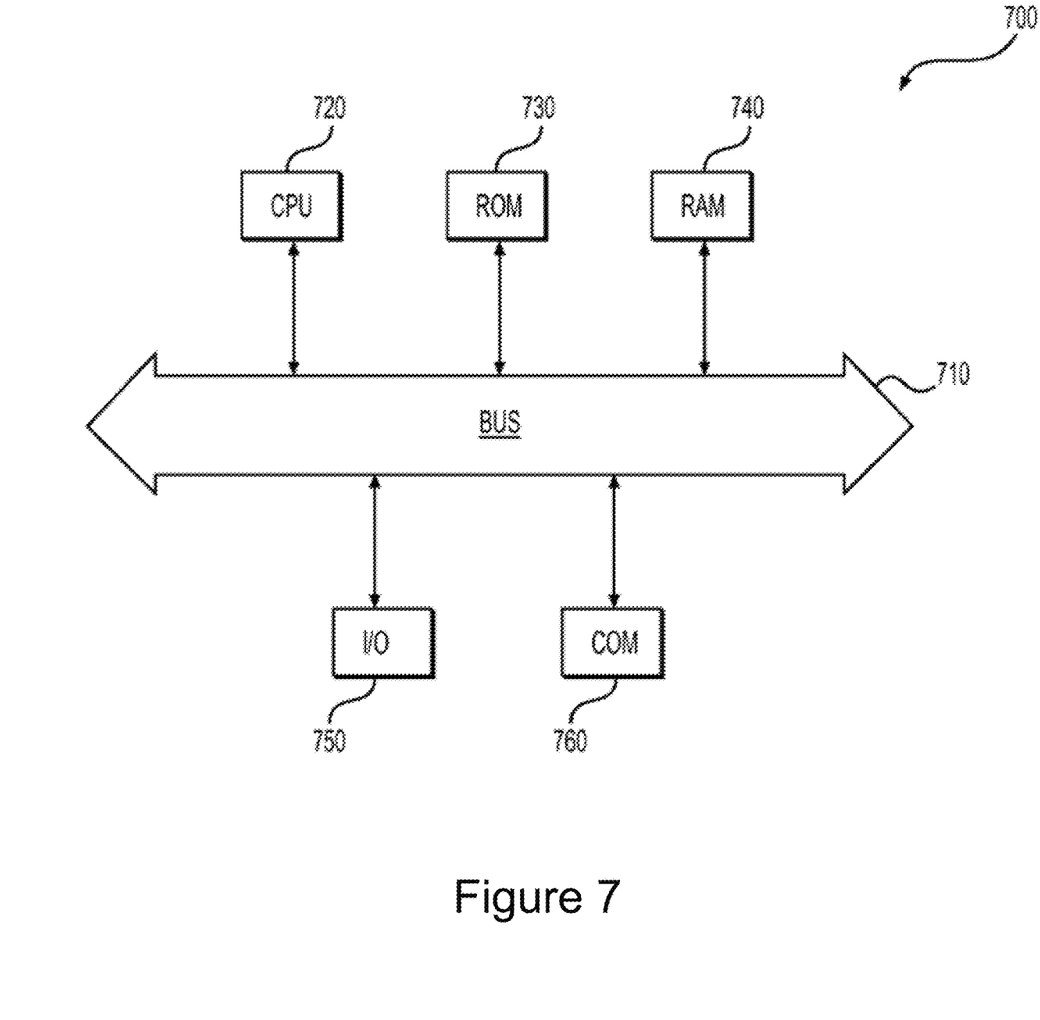
FIG. 7 is a simplified functional block diagram of a computer that may be configured as a device for executing the methods of FIG. 6, according to exemplary embodiments of the present disclosure.

FIG. 7 is a simplified functional block diagram of a computer that may be configured as devices, systems, and/or servers for executing the methods, according to exemplary an embodiment of the present disclosure. Specifically, in one embodiment, any of the devices, systems, and/or servers may be an assembly of hardware 700 including, for example, a data communication interface 760 for packet data communication. The platform may also include a central processing unit ("CPU") 720, in the form of one or more processors, for executing program instructions. The platform includes an internal communication bus 710, program storage, and data storage for various data files to be processed and/or communicated by the platform, such as ROM 730 and RAM 740, although the system 700 receives programming and data via network communications 760. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical and line networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data within a vehicle, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for using a video capture device to alleviate motion sickness via an augmented display for a passenger, the method comprising:
   receiving, from a video capture device, video data of a view outside of a vehicle while the vehicle is in motion;
   analyzing video data of the video capture device of the view outside of the vehicle while the vehicle is in motion to identify at least one target object in the video data representing a real object in the view outside of the vehicle;
   displaying, on the display device for the passenger, the video data including a menu, the menu including a plurality of selectable icons to interact with the identified at least one target object in the video data, wherein the plurality of selectable icons are based on at least one of the identified real object and the analyzed video data; and
   displaying, on the display device for the passenger, augmented video data that includes at least one virtual object on or around the identified real object based on a selection of a first selectable icon of the plurality of selectable icons, wherein a neighboring vehicle collides with the at least one virtual object.

2. The method according to claim 1, wherein the at least one virtual object includes one or more of i) walls, ii) pot holes, iii) oil spills, iv) slime, and v) simulated objects.

3. The method according to claim 1, wherein the video capture device of the vehicle is one of mounted in the vehicle or on the vehicle.

4. The method according to claim 1, wherein the video data of the video capture device is of a forward-facing view outside of the vehicle while the vehicle is in motion.

5. The method according to claim 1, further comprising:
   receiving the selection of the first selectable icon of the plurality of selectable icons, wherein the selection of the first selectable icon identifies the at least one virtual object to include in the augmented video data.

6. The method according to claim 1, wherein displaying augmented video data includes: creating, by the display device, an augmented video data by one of merging, augmenting, and fusing the video data of the video capture device with the at least one virtual object, wherein the at least one virtual object are based on the selection of the first selectable icon by the passenger.

7. The method according to claim 1, further comprising:
   sending a request to identify at least one of a type of color, a type of vehicle, a type of road feature, a word and a character in the augmented video data.

8. The method according to claim 6, further comprising:
   receiving a response to the request to identify at least one of a type of color, a type of vehicle, a type of road feature, a word and a character in the augmented video data; and
   assigning a point value based on the received response.

9. A system for using a video capture device to alleviate motion sickness via an augmented display for a passenger, the system including:
   a data storage device that stores instructions for using a video capture device to alleviate motion sickness via an augmented display for a passenger; and
   a processor configured to execute the instructions to perform a method including:
      receiving, from a video capture device, video data of a view outside of a vehicle while the vehicle is in motion;
      analyzing video data of the video capture device of the view outside of the vehicle while the vehicle is in motion to identify at least one target object in the video data representing a real object in the view outside of the vehicle;
      displaying, on the display device for the passenger, the video data including a menu, the menu including a plurality of selectable icons to interact with the identified at least one target object in the video data, wherein the plurality of selectable icons are based on at least one of the identified real object and the analyzed video data; and
      displaying, on the display device for the passenger, augmented video data that includes at least one virtual object on or around the identified real object based on a selection of a first selectable icon of the plurality of selectable icons, wherein a neighboring vehicle collides with the at least one virtual object.

10. The system according to claim 9, wherein the at least one virtual object includes one or more of i) walls, ii) pot holes, iii) oil spills, iv) slime, and v) simulated objects.

11. The system according to claim 9, wherein the video capture device of the vehicle is one of mounted in the vehicle or on the vehicle.

12. The system according to claim 9, wherein the video data of the video capture device is of a forward-facing view outside of the vehicle while the vehicle is in motion.

13. The system according to claim 9, further comprising:
   receiving the selection of the first selectable icon of the plurality of selectable icons, wherein the selection of the first selectable icon identifies the at least one virtual object to include in the augmented video data.

14. The system according to claim 9, wherein displaying augmented video data includes: creating, by the display device, an augmented video data by one of merging, augmenting, and fusing the video data of the video capture device with the at least one virtual object, wherein the at least one virtual object are based on the selection of the first selectable icon by the passenger.

15. The system according to claim 9, further comprising:
   sending a request to identify at least one of a type of color, a type of vehicle, a type of road feature, a word and a character in the augmented video data.

16. The system according to claim 15, further comprising:
   receiving a response to the request to identify at least one of a type of color, a type of vehicle, a type of road feature, a word and a character in the augmented video data; and
   assigning a point value based on the received response.

17. A non-transitory computer-readable medium storing instructions that, when executed by a computer, cause the computer to perform a method for using a video capture device to alleviate motion sickness via an augmented display for a passenger, the method including:

receiving, from a video capture device, video data of a view outside of a vehicle while the vehicle is in motion;

analyzing video data of the video capture device of the view outside of the vehicle while the vehicle is in motion to identify at least one target object in the video data representing a real object in the view outside of the vehicle;

displaying, on the display device for the passenger, the video data including a menu, the menu displayed with the video data and including a plurality of selectable icons to interact with the identified at least one target object in the video data, wherein the plurality of selectable icons are based on at least one of the identified real object and the analyzed video data; and displaying, on the display device for the passenger, augmented video data that includes at least one virtual object on or around the identified real object based on a selection of a first selectable icon of the plurality of selectable icons, wherein a neighboring vehicle collides with the at least one virtual object.

18. The computer-readable medium of claim 17, wherein the at least one virtual object includes one or more of i) walls, ii) pot holes, iii) oil spills, iv) slime, and v) simulated objects.

19. The computer-readable medium of claim 17, further comprising:

sending a request to identify at least one of a type of color, a type of vehicle, a type of road feature, a word and a character in the augmented video data.

20. The computer-readable medium of claim 19, further comprising:

receiving a response to the request to identify at least one of a type of color, a type of vehicle, a type of road feature, a word and a character in the augmented video data; and assigning a point value based on the received response.

* * * * *